United States Patent
Ghaffarzadegan et al.

(10) Patent No.: US 11,295,756 B2
(45) Date of Patent: Apr. 5, 2022

(54) ONTOLOGY-AWARE SOUND CLASSIFICATION

(71) Applicant: Robert Bosch GmbH, Stuttgart (DE)

(72) Inventors: Shabnam Ghaffarzadegan, San Mateo, CA (US); Zhe Feng, Mountain View, CA (US); Yiwei Sun, State College, PA (US)

(73) Assignee: Robert Bosch GmbH, Stuttgart (DE)

(*) Notice: Subject to any disclaimer, the term of this patent is extended or adjusted under 35 U.S.C. 154(b) by 86 days.

(21) Appl. No.: 16/729,098

(22) Filed: Dec. 27, 2019

(65) Prior Publication Data

US 2021/0201930 A1  Jul. 1, 2021

(51) Int. Cl.
| | | |
|---|---|---|
| G10L 25/51 | (2013.01) | |
| G06F 16/901 | (2019.01) | |
| G10L 25/30 | (2013.01) | |
| G06N 3/04 | (2006.01) | |

(52) U.S. Cl.
CPC .......... G10L 25/51 (2013.01); G06F 16/9024 (2019.01); G06N 3/0445 (2013.01); G06N 3/0454 (2013.01); G10L 25/30 (2013.01)

(58) Field of Classification Search
CPC ........ G06F 16/65; G06F 16/68; G06F 16/683; G06F 16/686; G06F 16/9024; G10L 25/30; G10L 25/51; G06N 3/0445; G06N 3/0454
See application file for complete search history.

(56) References Cited

U.S. PATENT DOCUMENTS

| | | | | |
|---|---|---|---|---|
| 2001/0044719 | A1* | 11/2001 | Casey | G06F 16/683 704/245 |
| 2019/0251480 | A1* | 8/2019 | Garcia Duran | G06N 20/20 |
| 2020/0104319 | A1* | 4/2020 | Jati | G06F 16/634 |
| 2020/0342968 | A1* | 10/2020 | Avinash | G06N 20/00 |
| 2020/0349975 | A1* | 11/2020 | Krishnamurthy | G11B 27/036 |

OTHER PUBLICATIONS

Defferrard, M., Benzi, K., Vandergheynst, P., & Bresson, X., "FMA: A Dataset for Music Analysis", Sep. 5, 2017, arXiv.org, arXiv: 1612.01840v3, pp. 1-8. (Year: 2017).*

(Continued)

*Primary Examiner* — Ryan Robinson
*Assistant Examiner* — Daniel R Sellers
(74) *Attorney, Agent, or Firm* — Michael Best & Friedrich LLP (57) ABSTRACT

A system for ontology-aware sound classification. The system includes an electronic processor that is configured to create a first graph based on relationships between fine audio classification labels and create a second graph based on relationships between coarse audio classification labels. The electronic processor is also configured to receive an audio clip including one or more sounds, execute a first graph convolutional network with the first graph as input, and execute a second graph convolutional network with the second graph as input. Using the outputs of the first graph convolutional network and the second graph convolutional network, the electronic processor is configured to determine one or more coarse labels, one or more fine labels, or both to classify the one or more sounds in the audio clip.

20 Claims, 4 Drawing Sheets (56) References Cited

OTHER PUBLICATIONS

Zhang, S., Qin, Y., Sun, K., & Lin, Y., "Few-Shot Audio Classification with Attentional Graph Neural Networks", Sep. 19, 2019, Interspeech, pp. 3649-3653). (Year: 2019).*
Jort F Gemmeke, Daniel PW Ellis, Dylan Freedman, Aren Jansen, Wade Lawrence, R Channing Moore, Manoj Plakal, and Marvin Ritter, "Audio set: An ontology and human-labeled dataset for audio events," in ICASSP, 2017, pp. 776-780.
Gen Takahashi, Takeshi Yamada, Shoji Makino, and Nobutaka Ono, "Acoustic Scene Classification Using Deep Neural Network and Frame-Concatenated Acoustic Feature," in DCASE2016 Chall., 2016.
Xiaodan Zhuang, Xi Zhou, Thomas S Huang, and Mark Hasegawa-Johnson, "Feature Analysis and Selection for Acoustic Event Detection," in Int. conf. on Acoustics, Speech and Signal Processing (ICASSP), 2008.
Shawn Hershey, Sourish Chaudhuri, Daniel PW Ellis, Jort F Gemmeke, Aren Jansen, R Channing Moore, Manoj Plakal, Devin Platt, Rif A Saurous, Bryan Seybold, et al., "CNN architectures for large-scale audio classification," in Int. conf. on Acoustics, Speech and Signal Processing (ICASSP). IEEE, 2017, pp. 131-135.
B. Elizalde A. Jimenez and B. Raj, "Sound event classification using ontology-based neural networks," NIPS 2018 Workshop, 2018.
Xiaolong Wang, Yufei Ye, and Abhinav Gupta, "Zeroshot recognition via semantic embeddings and knowledge graphs," in Proceedings of the IEEE Conference on Computer Vision and Pattern Recognition, 2018, pp. 6857-6866.
Zhao-Min Chen, Xiu-ShenWei, PengWang, and Yanwen Guo, "Multi-label image recognition with graph convolutional networks," in Proceedings of the IEEE Conference on Computer Vision and Pattern Recognition, 2019, pp. 5177-5186.
Mehdi Allahyari, Krys J. Kochut, and Maciej K Janik, "Ontology-based text classification into dynamically defined topics," 2014 IEEE International Conference on Semantic Computing, pp. 273-278, 2014.
Zhichun Wang, Qingsong Lv, Xiaohan Lan, and Yu Zhang, "Cross-lingual knowledge graph alignment via graph convolutional networks," in Proceedings of the 2018 Conference on Empirical Methods in Natural Language Processing, 2018, pp. 349-357.
Thomas N. Kipf and Max Welling, "Semi-supervised classification with graph convolutional networks," in 5th International Conference on Learning Representations, ICLR 2017, Toulon, France, Apr. 24-26, 2017, Conference Track Proceedings, 2017.
Liang Yao, Chengsheng Mao, and Yuan Luo, "Graph convolutional networks for text classification," in AAAI, 2018.
HongYun Cai, VincentWenchen Zheng, and Kevin Chen-Chuan Chang, "A comprehensive survey of graph embedding Problems, techniques, and applications," IEEE Transactions on Knowledge and Data Engineering, vol. 30, pp. 1616-1637, 2017.
Michael M Bronstein, Joan Bruna, Yann LeCun, Arthur Szlam, and Pierre Vandergheynst, "Geometric deep learning: going beyond euclidean data," IEEE Signal Processing Magazine, vol. 34, No. 4, pp. 18-42, 2017.
Juan P. Bello, Claudio Silva, Oded Nov, R. Luke Dubois, Anish Arora, Justin Salamon, Charles Mydlarz, and Harish Doraiswamy, "Sonyc: A system for monitoring, analyzing, and mitigating urban noise pollution," Communications of the ACM, vol. 62, No. 2, pp. 68-77, Feb. 2019.
Justin Salamon, Christopher Jacoby, and Juan Pablo Bello, "A dataset and taxonomy for urban sound research," in Proceedings of the 22nd ACM International Conference on Multimedia, New York, NY, USA, 2014, MM '14, pp. 1041-1044, ACM.
Qiuqiang Kong, Yin Cao, Turab Iqbal, Yong Xu, Wenwu Wang, and Mark D Plumbley, "Cross-task learning for audio tagging, sound event detection and spatial localization: Dcase 2019 baseline systems," arXiv preprint arXiv: 1904.03476, 2019.
Andrew L. Maas, Awni Y. Hannun, and Andrew Y. Ng, "Rectifier nonlinearities improve neural network acoustic models," in in ICML Workshop on Deep Learning for Audio, Speech and Language Processing, 2013.
Jeffrey Pennington, Richard Socher, and Christopher D. Manning, "Glove: Global vectors for word representation," in Empirical Methods in Natural Language Processing (EMNLP), 2014, pp. 1532-1543.

* cited by examiner

ONTOLOGY-AWARE SOUND CLASSIFICATION

BACKGROUND

Ontology is the formal structure of classes or types of objects within a domain. Ontology enables machine learning algorithms to process data in the context of what is known.

SUMMARY

Developing an audio classification system that has abilities similar to human hearing is a growing area of research. Unlike currently existing audio classification systems humans are capable of categorizing both ambiguous sounds and over-lapping sounds into abstract concepts or categories. This enables humans to disambiguate sounds and understand the environment in which the sounds originated. For example, humans can categorize shouting and baby crying as sub-categories of human sound (a category). Humans can categorize a car horn either as a member of the general category of street sound or a member of the more specific category of car sound.

To bridge the gap between human and machine sound classification abilities, embodiments described herein, among other things, augment sound classification models with the ontology structure of sound labels or types and category sound labels or types.

Incorporating the relationships between labels in the form of ontology in the audio domain is, in general, a non-trivial task since there is no intrinsic graph structure for the audio labels. However, when ontology in the audio domain is utilized in audio classification, there are multiple benefits. Audio classification systems that utilize ontology in the audio domain are able to disambiguate audio classes that are acoustically similar but semantically different. Audio classification systems that utilize ontology in the audio domain are also able to classify sounds in a general category when the distinction between specific classification categories is minimal. In case of multi-label classification (for example, an audio clip including more than one sound to classify), audio classification systems that utilize ontology in the audio domain are able to use the likelihood that sounds co-occur in real world to better classify over-lapping sounds.

One embodiment provides an example system for ontology-aware sound classification. The system includes an electronic processor that is configured to create a first graph based on relationships between fine audio classification labels and create a second graph based on relationships between coarse audio classification labels. The electronic processor is also configured to receive an audio clip including one or more sounds, execute a first graph convolutional network with the first graph as input, and execute a second graph convolutional network with the second graph as input. Using the outputs of the first graph convolutional network and the second graph convolutional network, the electronic processor is configured to determine one or more coarse labels, one or more fine labels, or both to classify the one or more sounds in the audio clip.

Another embodiment provides an example method of ontology-aware sound classification. The method includes creating a first graph based on relationships between fine audio classification labels and creating a second graph based on relationships between coarse audio classification labels. The method also includes receiving an audio clip including one or more sounds, executing a first graph convolutional network with the first graph as input, and executing a second graph convolutional network with the second graph as input. The method further includes using the outputs of the first graph convolutional network and the second graph convolutional network to determine one or more coarse labels, one or more fine labels, or both to classify the one or more sounds in the audio clip.

Other aspects, features, and embodiments will become apparent by consideration of the detailed description and accompanying drawings.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors configured in centralized or distributed fashions. In some instances, "control units" and "controllers" described in the specification can include one or more electronic processors, one or more memory modules including non-transitory computer-readable medium, one or more communication interfaces, one or more application specific integrated circuits (ASICs), and various connections (for example, a system bus) connecting the various components.

Figure 1:
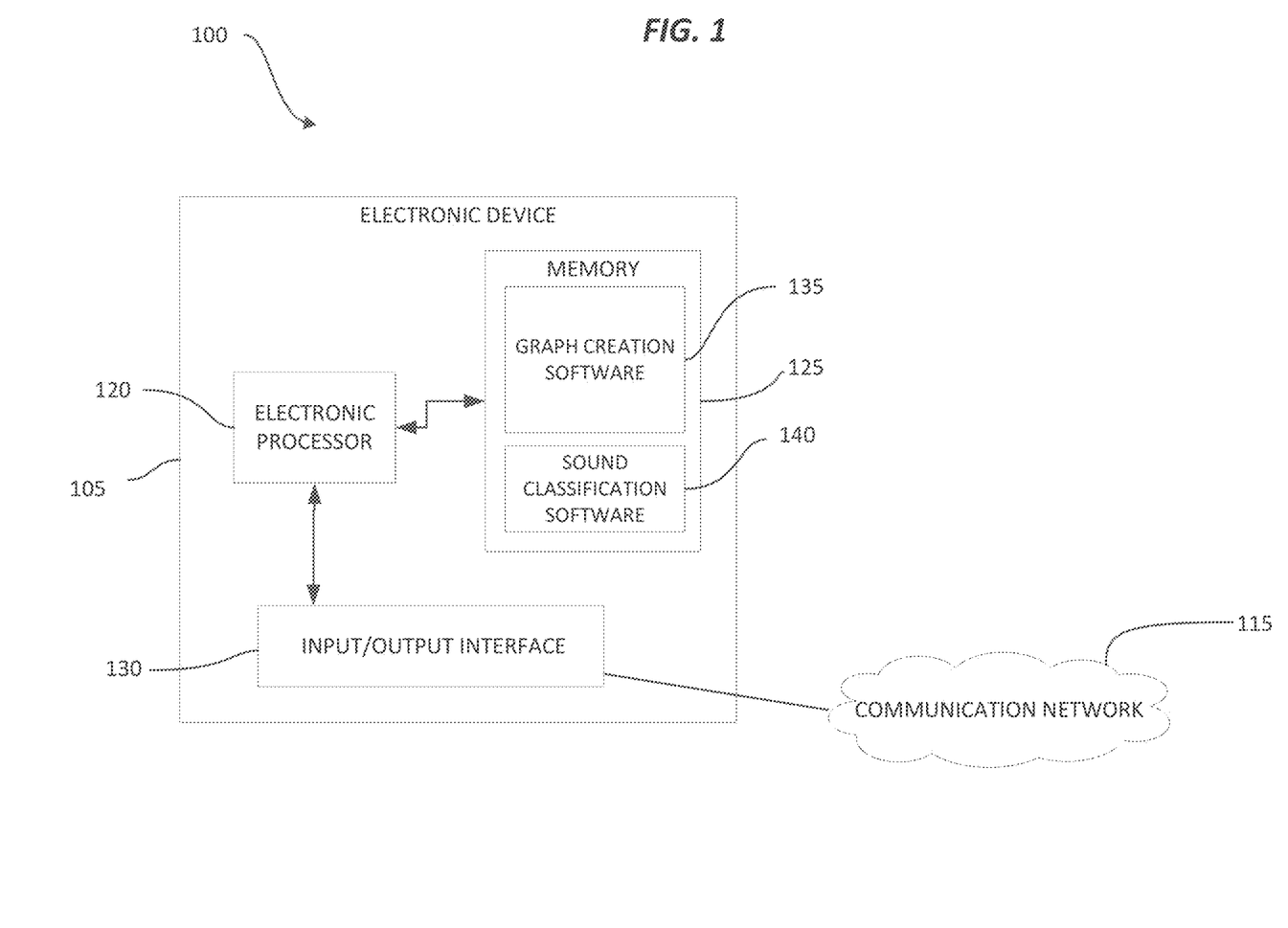
FIG. 1 is a block diagram of an example system for ontology-aware sound classification according to one embodiment.

FIG. 1 illustrates an example system 100 for ontology-aware sound classification. The system 100 includes an electronic device 105. The electronic device 105 may be a laptop or desktop computer, a tablet computer, smart phone, a server, or other computing device. In some embodiments, the electronic device 105 communicates over a communication network 115 with one or more other electronic devices. In one example, the electronic device 105 may be a server in communication with one or more user devices which the electronic device 105 receives audio clips from and provides sound classifications to. The communication network 115 includes one or more wired networks, wireless networks, or a combination thereof that enable communications within the system 100. For example, in some configurations, the communication network 115 includes cable networks, the Internet, local area networks (LANs), wide area networks (WAN), mobile telephone networks (MTNs), and other types of networks, possibly used in conjunction with one another, to facilitate communication between the electronic device 105 and other electronic devices included in the system 100.

The embodiment illustrated in FIG. 1 provides but one example of the components and connections of the system 100. However, these components and connections may be constructed in other ways than those illustrated and described herein.

The electronic device 105 includes a plurality of electrical and electronic components that provide power, operation control, and protection to the components and modules within the electronic device 105. The electronic device 105 includes, among other things, an electronic processor 120 (such as a programmable electronic microprocessor, microcontroller, or similar device), a memory 125 (for example, non-transitory, computer readable memory), and an input/output interface 130. The electronic processor 120 is communicatively connected to the memory 125 and the input/output interface 130. The electronic processor 120, in coordination with the memory 125 and the input/output interface 130, is configured to implement, among other things, the methods described herein. It should be understood that the electronic device 105 may also include one or more microphones that capture data audio data that may be input to a machine learning algorithm for sound classification.

As will be described in further detail below, the memory 125 includes computer executable instructions for ontology-aware sound classification. In the example illustrated in FIG. 1, the memory 125 includes graph creation software 135 and sound classification software 140, each of which are described in further detail below. In some embodiments, the sound classification software 140 includes a machine learning algorithm such as the machine learning algorithm illustrated in FIG. 4. It should be understood that the memory 125 may include more, fewer, or different programs or software components than those illustrated in FIG. 1. It should also be understood that functionality or values described herein as being associated with one component of the memory 125 may, in other embodiments, be associated with a different component of the memory 125.

In some embodiments, the electronic device 105 may be implemented in several independent controllers (for example, programmable electronic controllers) each configured to perform specific functions or sub-functions. Additionally, the electronic device 105 may contain sub-modules that include additional electronic processors, memory, or application specific integrated circuits (ASICs) for handling input/output functions, processing of signals, and application of the methods listed below. In other embodiments, the electronic device 105 includes additional, fewer, or different components. Thus, the programs may also be distributed among one or more processors and one or more memories.

Figure 2:
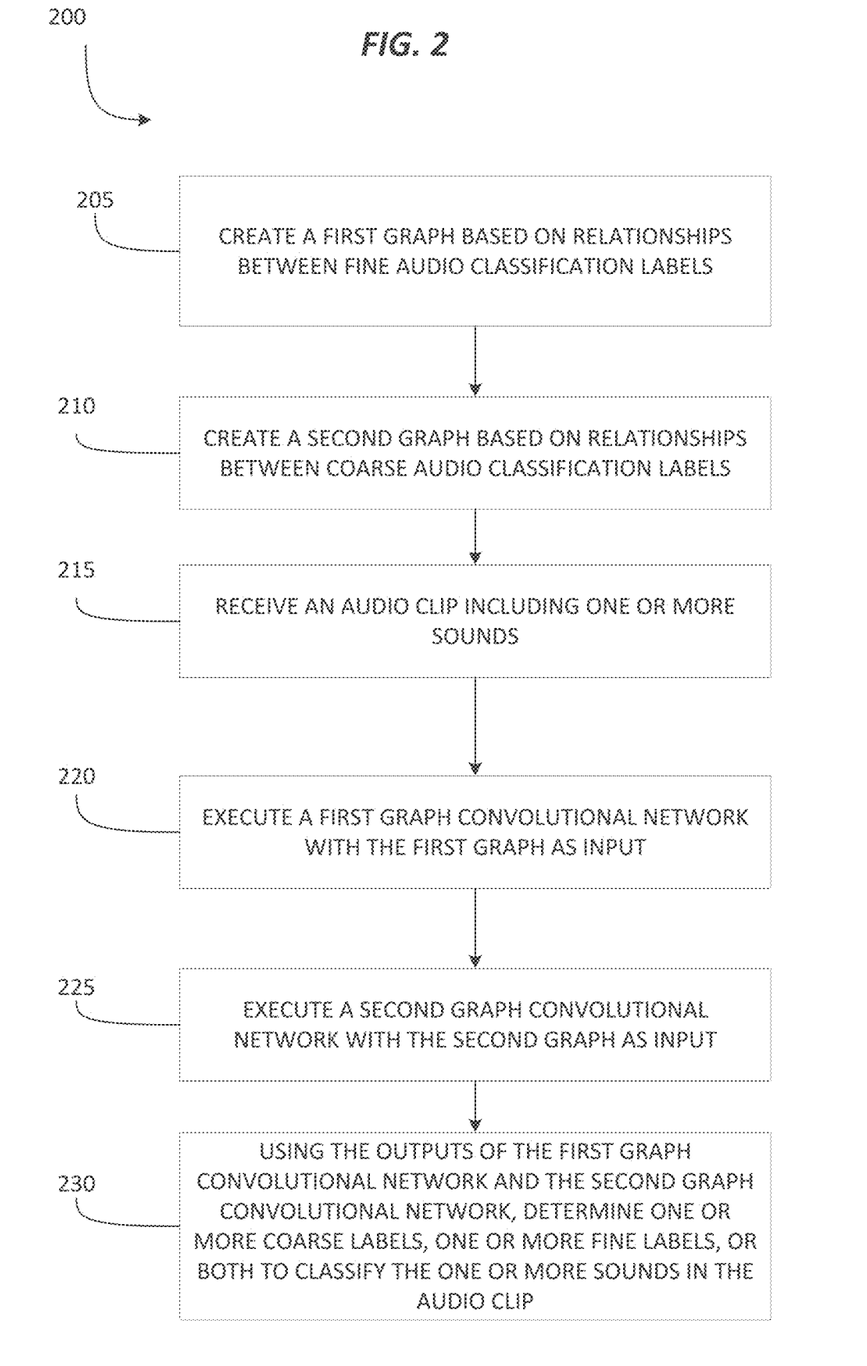
FIG. 2 is an example flowchart of a method of using the system of FIG. 1 for ontology-aware sound classification according to one embodiment.

FIG. 2 is a flow chart illustrating an example method 200 of ontology-aware sound classification. The method 200 begins at step 205 when the electronic processor 120 creates a first graph based on relationships between fine audio classification labels. In some embodiments, each node included in the first graph is associated with a fine label. At step 210, the electronic processor 120 creates a second graph based on relationships between coarse audio classification labels. In some embodiments, each node included in the second graph is associated with a coarse label. In one example, fine audio classification labels may be crying, screaming, and laughing and coarse audio classification labels may be human sound and baby sound. In some embodiments, fine labels are associated with a specific sound while coarse labels are associated with categories of sounds. The discussion of FIG. 3 below provides an example of how the first graph and the second graph are created by the electronic processor 120 when the electronic processor 120 executes the graph creation software 135.

Figure 3:
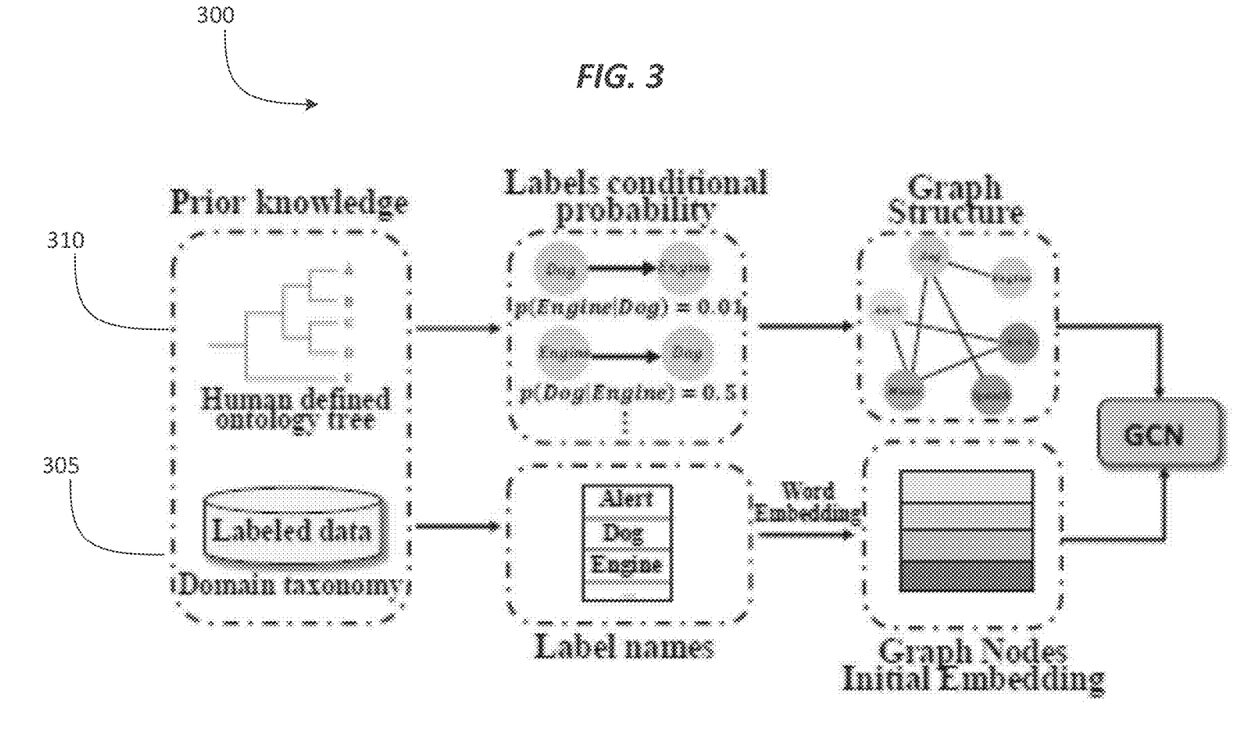
FIG. 3 is a graphical illustration of generating a graph of labels using ontology associated with the labels according to one embodiment.

FIG. 3 illustrates a graphical representation of a method 300 for creating a graph for audio labels from a plurality of labeled audio clips (the domain taxonomy 305) and one or more tree data structures defining sound label ontology 310. To build a graph for audio labels, the electronic processor 120 determines the number of nodes in the graph to be the number of labels in the domain taxonomy 305 and each node in the graph is associated with a label. The initial embeddings of each node in the graph is set to the word embedding of the label that the node is associated with. For the labels with more than one word, the electronic processor 120 determines an average word embedding of the one or more words included in the label and uses the average word embedding as the initial embedding of the node. For example, for the label small engine, the final word embedding is the average of the word embedding of the word embedding for the word small and the word embedding for the word engine. The edges of the graph are defined based on the probabilities of labels co-occurring. For example, if there is above a zero percent chance that if an audio clip includes a sound classified by a label associated with a first node then the audio clip also includes a sound classified by a label associated with a second node, the first node and second node are connected by an edge associated with the conditional probability that the labels associated with the first node and second node co-occur. The conditional probabilities for one or more edges may be calculated by the electronic processor 120 based on the one or more tree data structures defining sound label ontology 310. Mathematically, conditional probability between labels Li and Lj is defined as Pij=count$_{i|j}$/count$_j$, where count$_{i|j}$ is the number of times Li occurs when Lj occurs and count$_j$ is the total count of Lj in the domain taxonomy 305.

In the example illustrated in FIG. 3, one node is associated with the label "engine" and another node associated with the label "dog." The conditional probability that a sound labeled dog occurs in an audio clip given that a sound labeled engine occurs in the audio clip is 0.5. Therefore, in the graph there is a one directional edge associated with the value 0.5 going from the node labeled "engine" to the node labeled "dog". The conditional probability that a sound labeled engine occurs in an audio clip given that a sound labeled engine occurs in the audio clip is 0.1. Therefore, in the graph there is a directional edge associated with the value 0.1 going from the node labeled "dog" to the node labeled "engine".

The connections between nodes in the graph G may be represented by an adjacency matrix A. To avoid the A being over fit to training data (for example, the data structures 310), the electronic processor 120 may binarize the adjacency matrix as:

$$A_{ij} = \begin{cases} 0, & \text{if } P_{ij} < \tau \\ 1, & \text{if } P_{ij} \geq \tau \end{cases} \quad (2)$$

where τ may be defined as a hyper-parameter threshold level. In some embodiments, the threshold value τ=0.2 is chosen to binarize the adjacency matrix. In some embodiments, to avoid over smoothing, the electronic processor 120 re-weights the adjacency matrix as:

$$A'_{ij} = \begin{cases} p / \sum_{j=1}^{n} A_{ij}, & \text{if } i \neq j \\ 1-p & \text{if } i = j \end{cases} \quad (3)$$

where n may be the number of nodes and p may be a hyper-parameter which defines the weight assigned to an edge. In some embodiments, p is set to 0.2.

Figure 4:
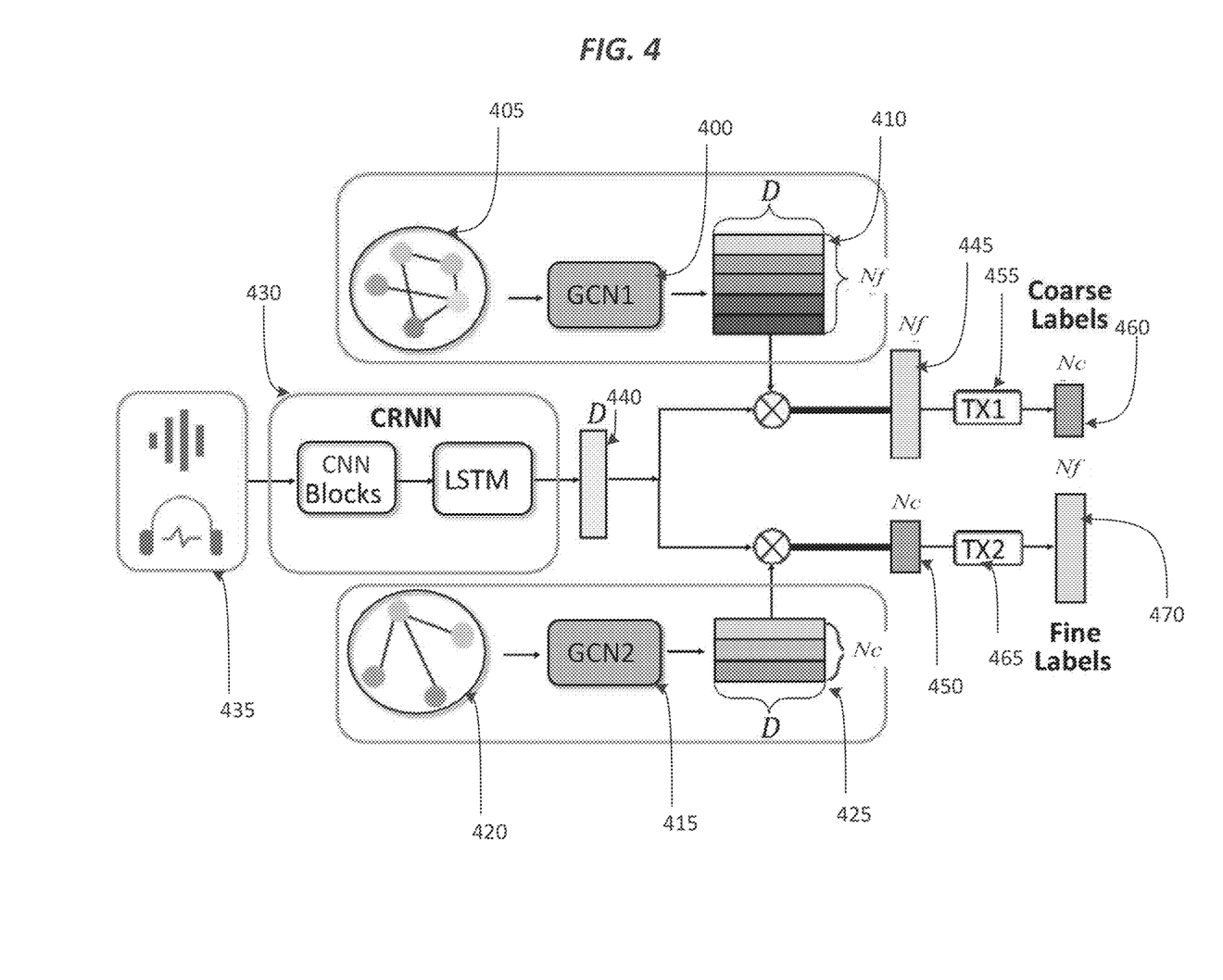
FIG. 4 is a graphical illustration of a machine learning algorithm for ontology-aware sound classification according to one embodiment.

At step 215, the electronic processor 120 receives an audio clip including one or more sounds for classification. To classify the sounds included in the audio clip, the electronic processor 120 executes steps 220-230. FIG. 4 provides a graphical illustration of the sound classification software 140 that the electronic processor 120 executes to perform steps 220-230 and is referenced below in the discussion of steps 220-230. At step 220, the electronic processor 120 executes a first graph convolutional network (GCN) with the first graph generated at step 205 as input. At step 225, the electronic processor 120 executes a second graph convolutional network (GCN) with the second graph generated at step 210 as input.

A GCN is a multi-layer graph neural network that takes a graph of nodes as input and outputs a matrix of feature representations of nodes in the graph. A GCN determines a feature representation of a node in a graph based on the node's feature and the features of the node's neighbors. A one layer GCN can capture information from a node's immediate neighbors and a multi-layer GCN (which is the result of stacking multiple single layer GCNs) can capture information from larger neighborhood of nodes (for example, a node, the node's neighbors, the node's neighbor's neighbors, and so on depending on the number of layers).

For example, consider a graph G with n nodes. Let $X \in \mathbb{R}^{n \times m}$ be a matrix with features of n nodes with m dimensions. Let A be the adjacency matrix of graph G with its degree matrix D defined as $D_{ii} = \Sigma_j A_{ij}$. The diagonal elements of A are set to 1 due to self-loops. For a multi-layer GCN, receiving the graph G as input, a k-dimensional node feature matrix $L^{(j+1)} \in \mathbb{R}^{n \times k}$ is calculated as:

$$L^{(j+1)} = f(\hat{A} L^{(j)} W_j) \quad (1)$$

where j is the layer number, $\hat{A} = D^{-1/2} A D^{-1/2}$ is the smoothed adjacency matrix, Wj is the weight matrix of the GCN, f is a non-linear activation function of the GCN such as a ReLU function, and $L^{(0)} = X$.

Executing the first graph convolutional network (illustrated as 400 in FIG. 4) with the first graph (illustrated as 405 in FIG. 4) generated at step 205 as input produces a first node feature matrix of size D×Nf (the first matrix illustrated as 410 in FIG. 4). In some embodiments, D is a hyper-parameter of the graph and Nf is the number of fine labels. Executing the second graph convolutional network (illustrated as 415 in FIG. 4) with the second graph (illustrated as 420 in FIG. 4) generated at step 210 as input produces a second node feature matrix of size D×$N_C$ (the second matrix illustrated as 425 in FIG. 4) where $N_C$ is number of coarse labels. In some embodiments, the first graph convolutional network 400 and the second graph convolutional network 405 both contain 2 layer networks having a first layer of size 300×400 and a second layer of size 400×512. In some embodiments, a LeakyReLU function with the negative slope of 0.2 is used as the non-linearity function between the layers in the first graph convolutional network 400 and the second graph convolutional network 405 and sigmoid function is used as the final non-linearity function in the first graph convolutional network 400 and the second graph convolutional network 405. By utilizing GCNs, the electronic processor 120 utilizes context ontology. For example, in the context of a street scene, music and car engine sounds might be related and co-occur frequently in audio clips even though there is no semantic relationship or acoustic similarities between them.

At step 230, the electronic processor 120 determines one or more coarse labels, one or more fine labels, or both to classify the one or more sounds in the audio clip, using the outputs of the first graph convolutional network and the second graph convolutional network. For example, in the embodiment illustrated in FIG. 4, the electronic processor 120 executes a neural network (illustrated in FIG. 4 as a convolutional recurrent neural network 430) with the received audio clip (illustrated in FIG. 4 as 435) as input to produce a D dimensional vector 440. In some embodiments, the CRNN 430 includes eight convolutional neural network layers and one long short-term memory (LSTM) network layer. The electronic processor 120 multiplies the vector 440 by the first matrix 410 to produce one or more fine labels (illustrated in FIG. 4 as 445) predicted to be associated with the audio clip 435. The electronic processor 120 multiplies the vector 440 by the second matrix 425 to produce one or more coarse labels (illustrated in FIG. 4 as 450) predicted to be associated with the audio clip 435.

In some embodiments, the electronic processor 120 executes a single layer feed forward neural network 455 using the one or more fine labels as input to determine one or more coarse labels (illustrated in FIG. 4 as 460) associated with the audio clip 435 and a single layer feed forward neural network 465 using the one or more fine labels as input to determine one or more coarse labels (illustrated in FIG. 4 as 470) associated with the audio clip 435. The single layer feed forward neural networks 455, 465 may have sigmoid non-linearity. By utilizing the single layer feed forward neural networks 455, 465, the electronic processor 120 utilizes semantic ontology or the semantic relationship between labels. For example, the label "dog" belongs to the category/label "animal" and the labels "dog barking" and "whining" belong to the category/label "dog." Using the predicted coarse labels 450 as input to the single layer feed forward neural network 465 allows the electronic processor 120 to narrow the possible fine labels that could be used to classify the sound included in an audio clip. For example, if the electronic processor 120 determines the coarse label associated with an audio clip is "human sound," the electronic processor 120 is able to focus its fine label prediction to classes such as human speech, laughter, singing, and the like rather than, for example, the classes of engine sound or environmental sounds.

In some embodiments, a two-step process is used to train the sound classification software 140. In the first step of the training process, the electronic processor 120 calculates the output of a CRNN (for example, the CRNN 430) given an audio clip, as a vector predicting fine and coarse labels. Next, the electronic processor 120 multiplies the vector by a matrix output by GCN1 (for example, the first matrix 410) to predict fine labels. The electronic processor 120 uses the predicted fine labels to calculate a fine loss. The electronic processor 120 feeds the predicted fine labels to a first single layer feed forward neural network (for example, the single layer feed forward neural network 455) to output one or more predicted coarse labels. The electronic processor 120 calculates coarse loss using the predicted coarse labels. The electronic processor 120 determines the final loss of the first step to be weighted sum of the coarse loss and the fine loss determined in the first step of the training and performs back-propagation to update the parameters of the sound classification software 140 using the final loss determined for the first step in the training process.

In the second step of the training process in this example, the electronic processor 120 calculates or determines a vector with the CRNN (which has weights that were updated as a part of the first step) using the audio clip as input. The electronic processor 120 multiplies the vector with the matrix output by GCN2. The electronic processor 120 uses the coarse labels predicted in the second step to calculate coarse loss. The electronic processor 120 executes a second single layer feed forward neural network (for example, the single layer feed forward neural network 465) using the predicted coarse labels to output a prediction of one or more fine labels. The electronic processor 120 uses the fine labels predicted in the second step to calculate fine loss. The electronic processor 120 determines the final loss for the second step to be the weighted sum of the fine loss and coarse loss generated in the second step and performs back-propagation again to update the parameters of the sound classification software 140 using the final loss determined for the second step in the training process. The electronic processor 120 repeats the first and second steps of the training process until convergence. In some embodiments, stochastic gradient descent is used to optimize the sound classification software 140 and binary cross entropy is used as the loss function (for calculating fine loss and coarse loss).

The ontology-aware sound classification system 100 and method 200 described herein may be used in a wide variety of applications. For example, the embodiments described herein may be used in a home monitoring application to detect sounds such as a baby crying, a dog barking or whining, a window breaking, a door being forced, and the like. The embodiments, described herein may be used in urban monitoring or surveillance application. For example, the embodiments, described herein may be able to distinguish a gunshot from similar sounds such as a car backfiring in a noisy environment. The embodiments described herein may be used in an application for partially autonomous or fully autonomous vehicles. For example, the embodiments described herein may be able to determine, from traffic noise, whether an ambulance is approaching a vehicle with autonomous functionality. The embodiments described herein may also be used in a traffic monitoring application to, for example, determine how many cars utilize a road on a given day based on road noise.

It should be understood that while the embodiments herein have been described in the context of sound classification, the techniques described herein may be applied in other contexts such as object recognition in visualization forms.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

In this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Thus, the embodiments described herein provide, among other things, a system and a method ontology-aware sound classification. Various features and advantages of the embodiments are set forth in the following claims.

What is claimed is:

1. A system for ontology-aware sound classification, the system comprising an electronic processor configured to
    create a first graph based on relationships between fine audio classification labels;
    create a second graph based on relationships between coarse audio classification labels;
    receive an audio clip including one or more sounds;
    execute a first graph convolutional network with the first graph as input;
    execute a second graph convolutional network with the second graph as input; and
    using the outputs of the first graph convolutional network and the second graph convolutional network, determine one or more coarse labels and one or more fine labels to classify the one or more sounds in the audio clip.

2. The system according to claim 1, wherein the electronic processor is configured to determine one or more coarse labels and one or more fine labels to classify the one or more sounds in the audio clip by producing a vector from the audio clip using a neural network.

3. The system according to claim 2, wherein the neural network is a convolutional recurrent neural network.

4. The system according to claim 2, wherein the output of executing the first graph convolutional network with the first graph as input is a first matrix and the electronic processor is further configured to
    multiply the vector by the first matrix to produce one or more fine labels predicted to be associated with the audio clip.

5. The system according to claim 4, wherein the electronic processor is configured to execute a single layer feed forward neural network with the one or more fine labels predicted to be associated with the audio clip as input to produce one or more predicted coarse labels associated with the audio clip.

6. The system according to claim 2, wherein the output of executing the second graph convolutional network with the second graph as input is a second matrix and the electronic processor is further configured to
multiply the vector by the second matrix to produce a one or more coarse labels predicted to be associated with the audio clip.

7. The system according to claim 6, wherein the electronic processor is configured to
execute a single layer feed forward neural network with the one or more coarse labels predicted to be associated with the audio clip as input to produce one or more predicted fine labels associated with the audio clip.

8. The system according to claim 1, wherein the electronic processor is configured to create the first graph and the second graph using a plurality of labeled audio clips and one or more data structures defining sound label ontology.

9. The system according to claim 1, wherein each node included in the first graph is associated with a fine label and each node in the second graph is associated with a coarse label and edges in both the first graph and the second graph are associated with a probability that labels associated with nodes an edge connects co-occur in the audio clip.

10. The system according to claim 1, wherein the system is utilized by at least one selected from the group comprising a home monitoring application, a surveillance application, an autonomous vehicle application, and a traffic monitoring application.

11. A method for ontology-aware sound classification, the method comprising
creating a first graph based on relationships between fine audio classification labels;
creating a second graph based on relationships between coarse audio classification labels;
receiving an audio clip including one or more sounds;
executing a first graph convolutional network with the first graph as input;
executing a second graph convolutional network with the second graph as input; and
using the outputs of the first graph convolutional network and the second graph convolutional network, determining one or more coarse labels and one or more fine labels to classify the one or more sounds in the audio clip.

12. The method according to claim 11, wherein determining one or more coarse labels and one or more fine labels to classify the one or more sounds in the audio clip includes
producing a vector from the audio clip using a neural network.

13. The method according to claim 12, wherein the neural network is a convolutional recurrent neural network.

14. The method according to claim 12, wherein the output of executing the first graph convolutional network with the first graph as input is a first matrix and the method further comprising
multiplying the vector by the first matrix to produce one or more fine labels predicted to be associated with the audio clip.

15. The method according to claim 14, the method further comprising
executing a single layer feed forward neural network with the one or more fine labels predicted to be associated with the audio clip as input to produce one or more predicted coarse labels associated with the audio clip.

16. The method according to claim 12, wherein the output of executing the second graph convolutional network with the second graph as input is a second matrix and the method further comprising
multiplying the vector by the second matrix to produce a one or more coarse labels predicted to be associated with the audio clip.

17. The method according to claim 16, wherein the method further comprising
executing a single layer feed forward neural network with the one or more coarse labels predicted to be associated with the audio clip as input to produce one or more predicted fine labels associated with the audio clip.

18. The method according to claim 11, wherein the method further comprising
creating the first graph and the second graph using a plurality of labeled audio clips and one or more data structures defining sound label ontology.

19. The method according to claim 11, wherein each node included in the first graph is associated with a fine label and each node included in the second graph is associated with a coarse label and edges in both the first graph and the second graph are associated with a probability that labels associated with nodes an edge connects co-occur in the audio clip.

20. The method according to claim 11, wherein the method is utilized by at least one selected from the group comprising a home monitoring application, a surveillance application, an autonomous vehicle application, and a traffic monitoring application.

* * * * *